May 14, 1963 R. T. WISE ETAL 3,089,614
DISPENSER FOR CONICAL MEMBERS
Filed March 29, 1961 9 Sheets-Sheet 1
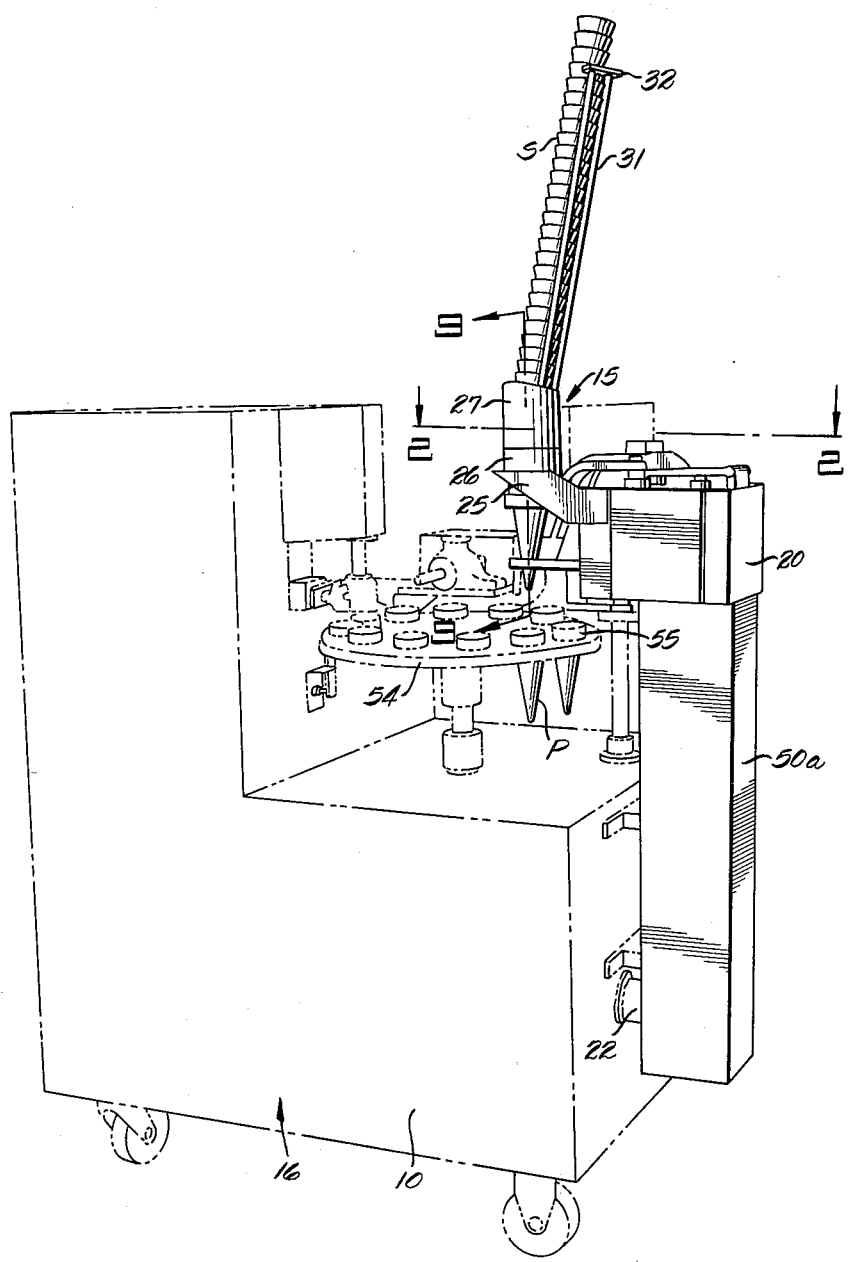
INVENTORS.
LEONARD A. ERICKSON
ROBERT T. WISE
BY MAHONEY, MILLER & RAMBO
BY Wm. V. Miller
ATTORNEYS.

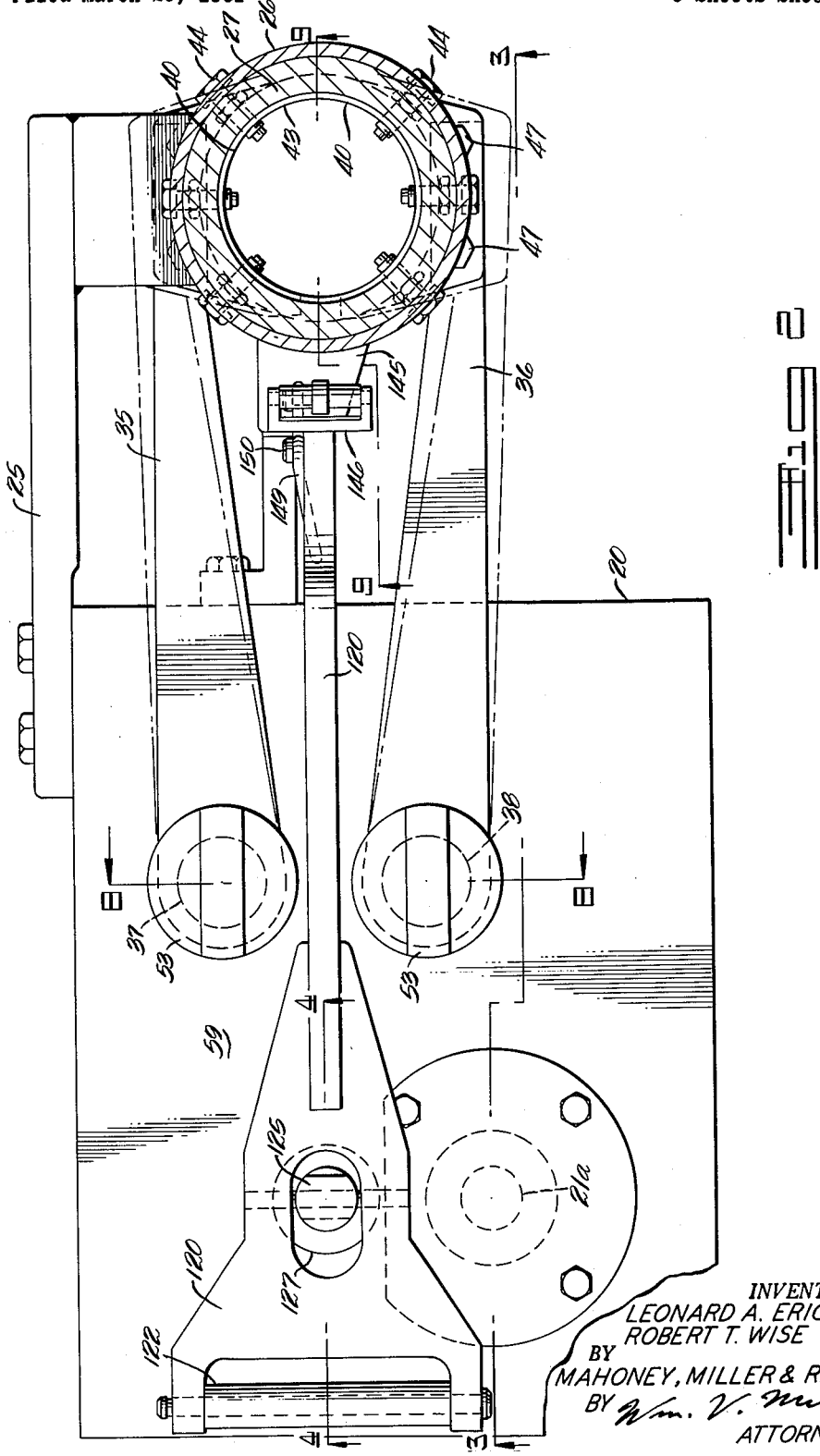

May 14, 1963  R. T. WISE ETAL  3,089,614
DISPENSER FOR CONICAL MEMBERS
Filed March 29, 1961  9 Sheets-Sheet 3
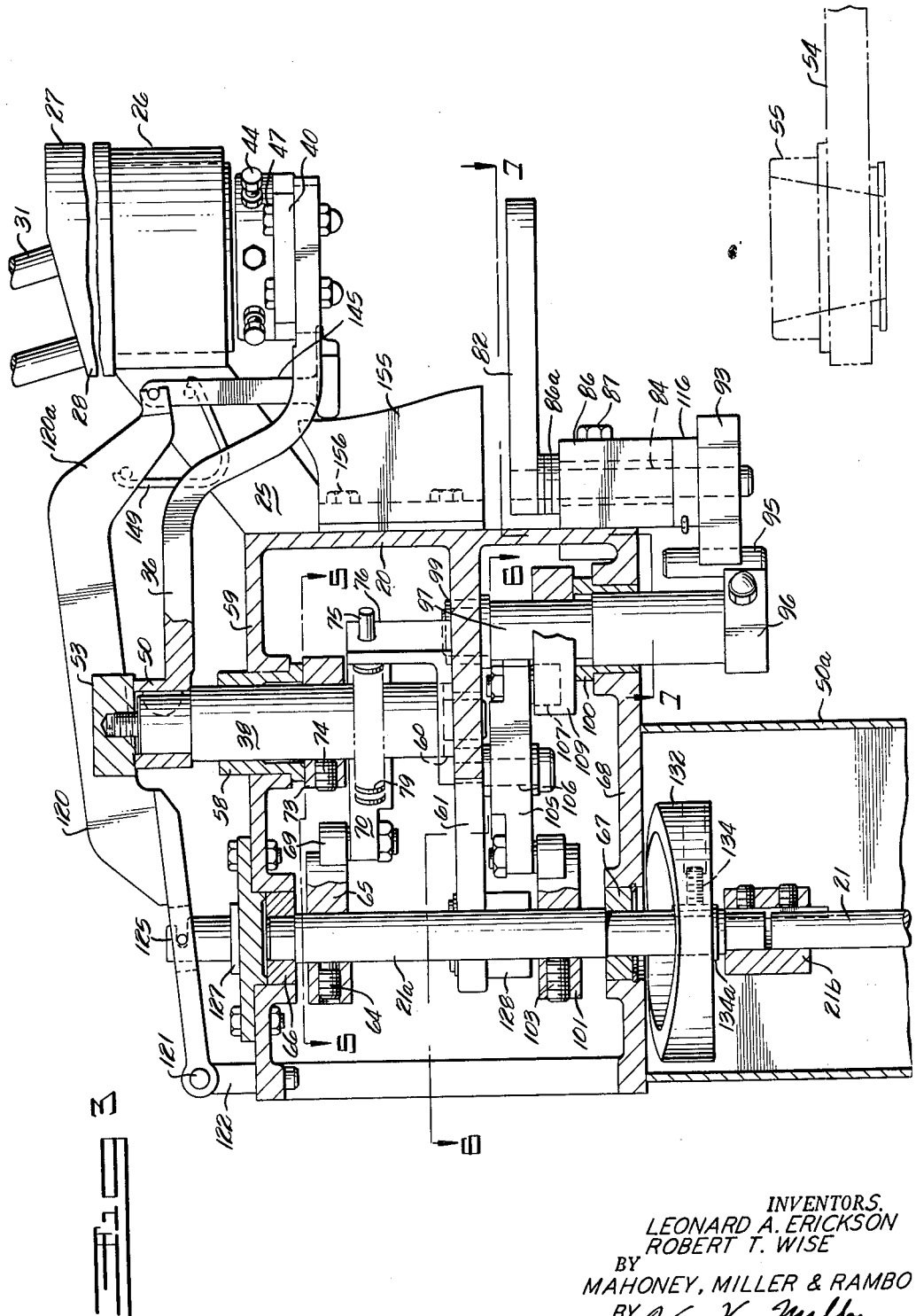
INVENTORS.
LEONARD A. ERICKSON
ROBERT T. WISE
BY
MAHONEY, MILLER & RAMBO
BY Wm. V. Miller
ATTORNEYS.

May 14, 1963 R. T. WISE ETAL 3,089,614
DISPENSER FOR CONICAL MEMBERS
Filed March 29, 1961 9 Sheets-Sheet 4
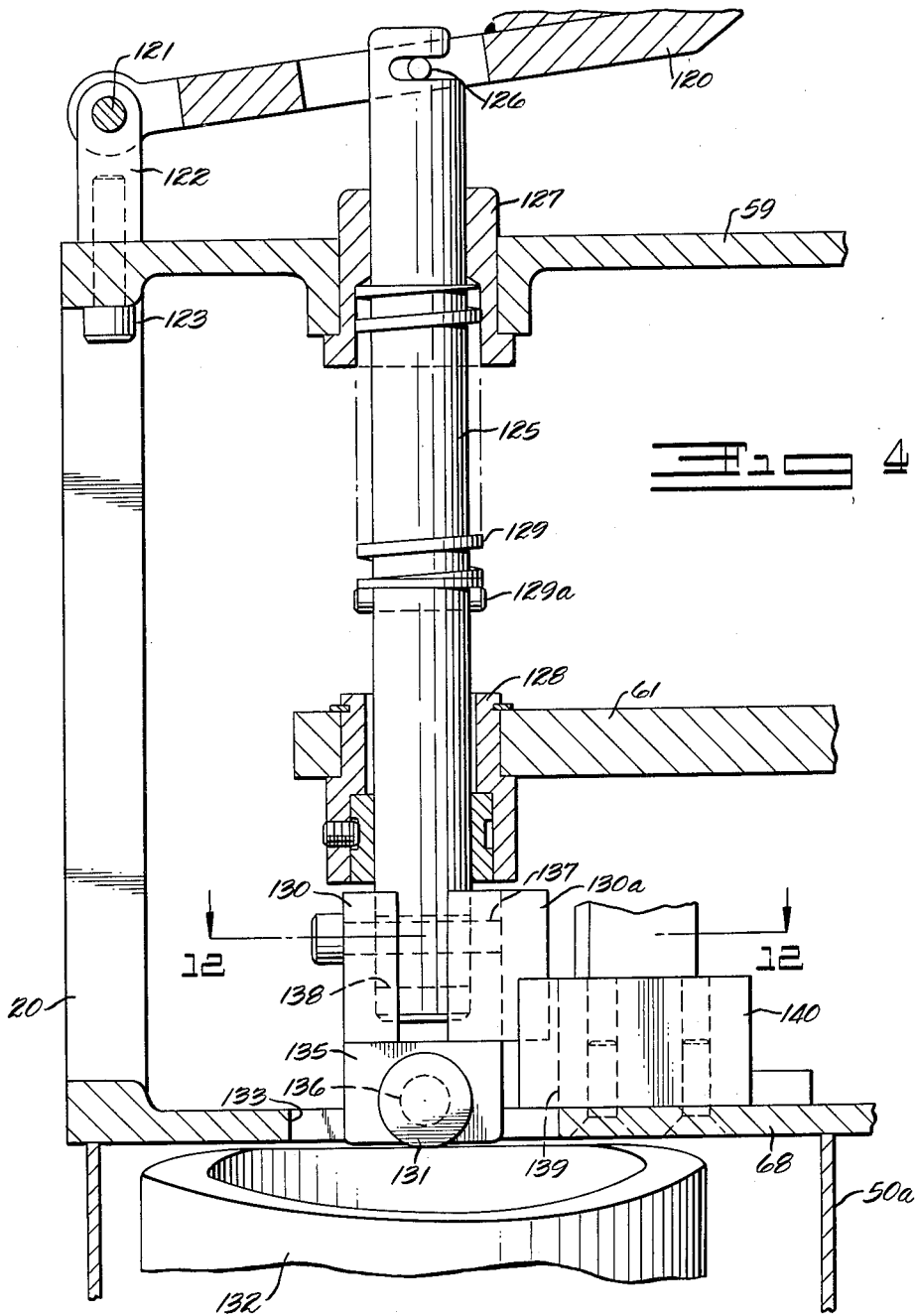
INVENTORS.
LEONARD A. ERICKSON
ROBERT T. WISE
BY MAHONEY, MILLER & RAMBO
BY Wm. V. Miller
ATTORNEYS.

May 14, 1963 R. T. WISE ETAL 3,089,614
DISPENSER FOR CONICAL MEMBERS
Filed March 29, 1961 9 Sheets-Sheet 5
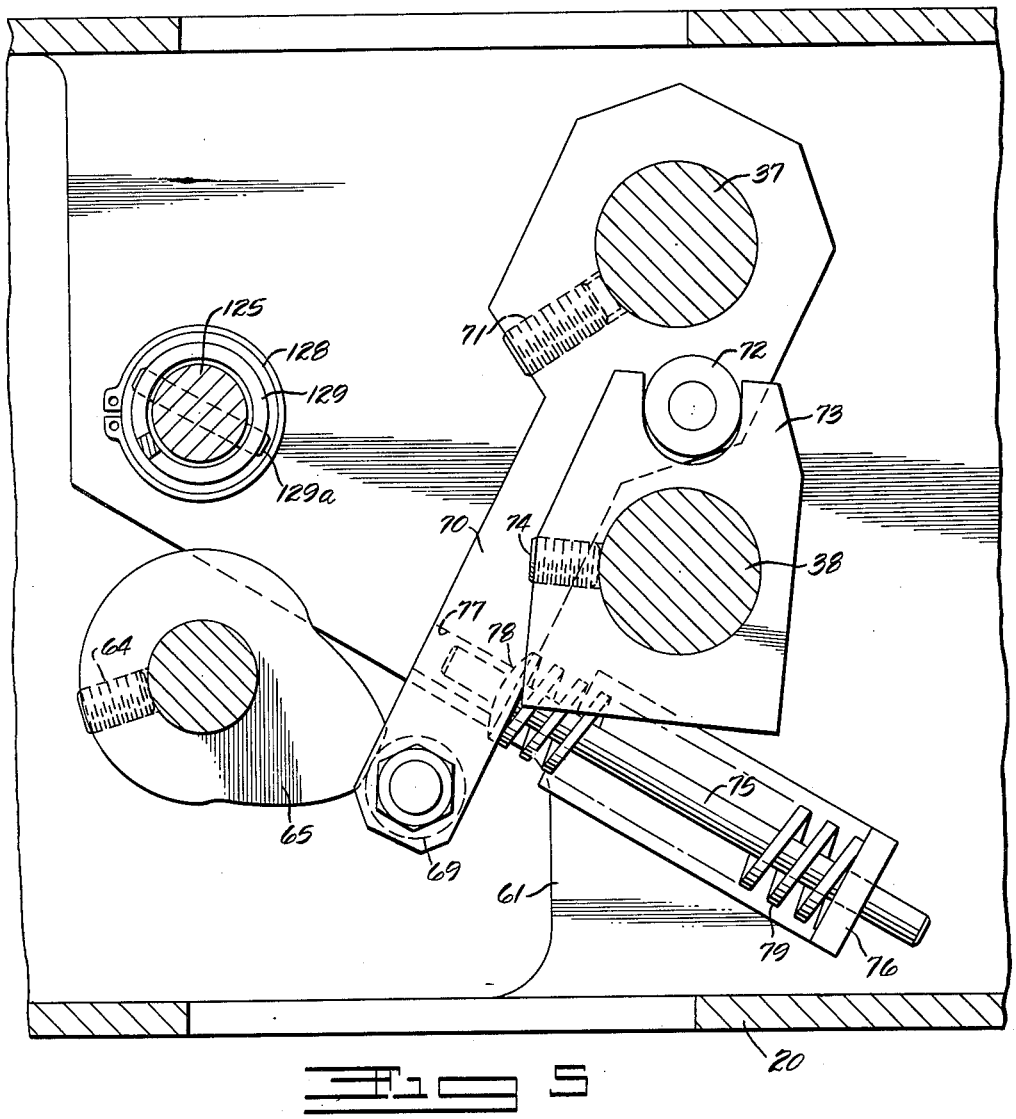
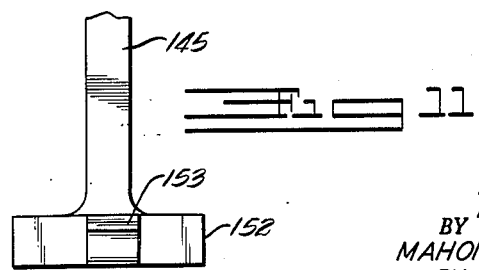
INVENTORS.
LEONARD A. ERICKSON
ROBERT T. WISE
BY
MAHONEY, MILLER & RAMBO
BY Wm. V. Miller
ATTORNEYS.

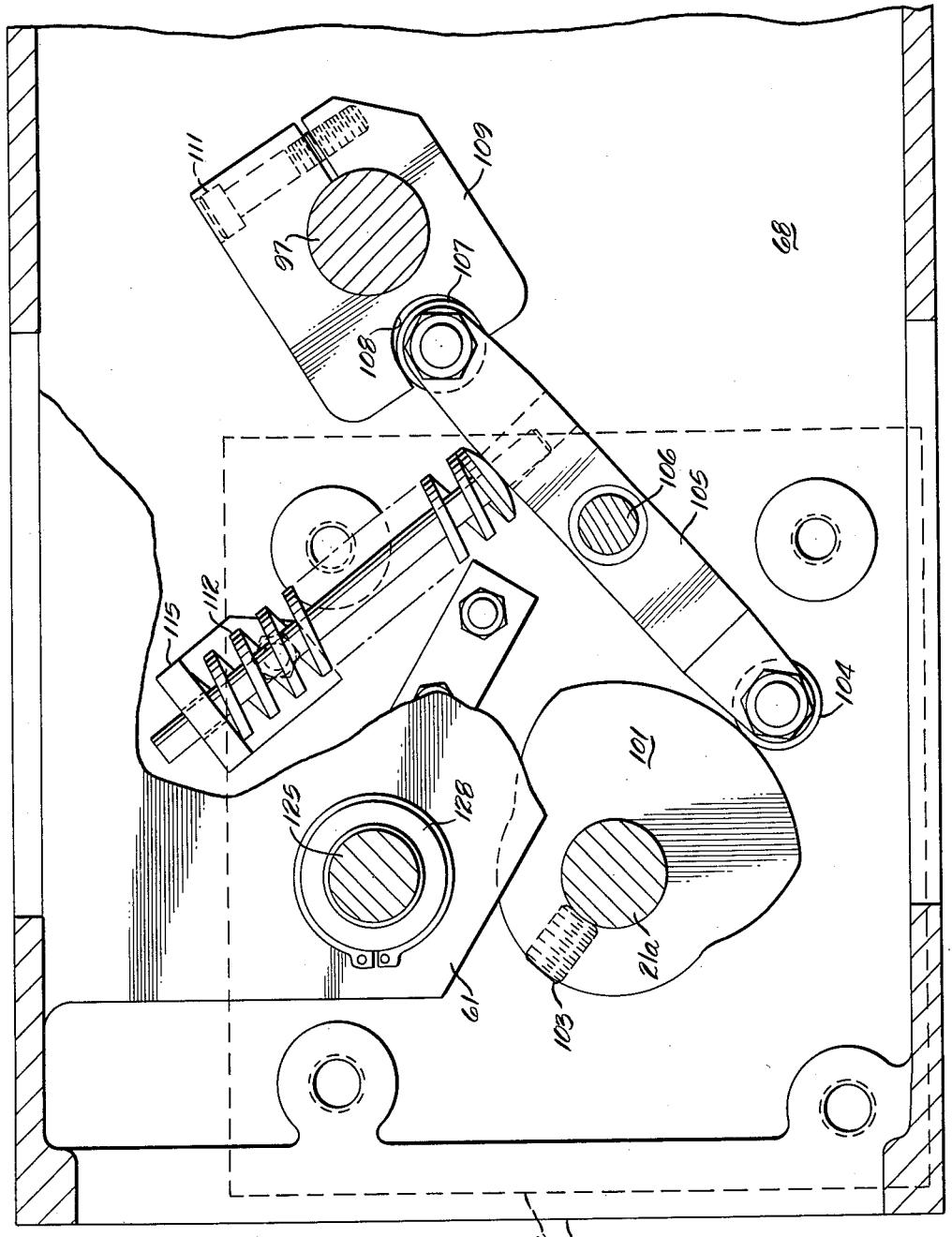

May 14, 1963  R. T. WISE ETAL  3,089,614
DISPENSER FOR CONICAL MEMBERS

Filed March 29, 1961  9 Sheets-Sheet 7

INVENTORS.
LEONARD A. ERICKSON
ROBERT T. WISE
BY MAHONEY, MILLER & RAMBO
BY Wm. V. Miller
ATTORNEYS.

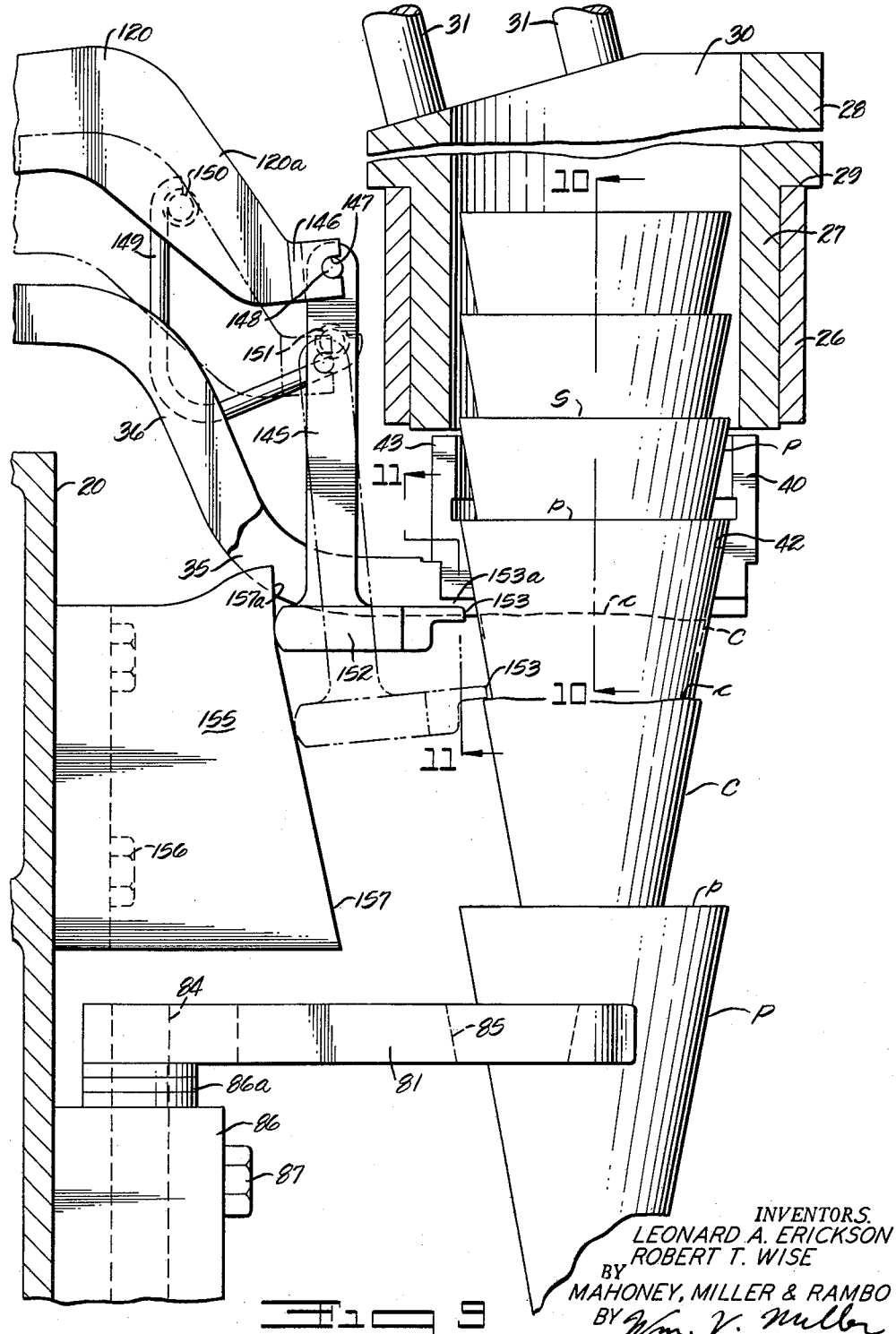

May 14, 1963 R. T. WISE ETAL 3,089,614
DISPENSER FOR CONICAL MEMBERS
Filed March 29, 1961 9 Sheets-Sheet 9

INVENTORS.
LEONARD A. ERICKSON
ROBERT T. WISE
BY MAHONEY, MILLER & RAMBO
BY Wm. V. Miller
ATTORNEYS.

United States Patent Office 3,089,614
Patented May 14, 1963

3,089,614
DISPENSER FOR CONICAL MEMBERS
Robert T. Wise, Worthington, and Leonard A. Erickson, Columbus, Ohio, assignors to Big Drum, Inc., a corporation of Ohio
Filed Mar. 29, 1961, Ser. No. 99,249
9 Claims. (Cl. 221—251)

Our invention relates to a dispenser for conical members. It has to do, more particularly, with a dispenser which will successively dispense conical members from a stack of the conical members which are in nested condition in a magazine.

More specifically, the present invention deals with a dispenser for dispensing a combination conical unit of the type used in connection with the packaging machine disclosed in the patent to Wise No. 2,934,872, which issued May 3, 1960. This conical unit comprises an edible cone of baked pastry which is to be filled with ice cream or the like and a protective conical sleeve of paper or the like within which the edible cone is enclosed. When the edible cone is properly positioned within the protective sleeve, the upper flexible edge of the sleeve extends above the corresponding edge of the edible cone. It is difficult to dispense effectively the combined conical unit to the machine of said patent for filling thereby without damaging the edible cone. This difficulty is increased by the fact that sometimes the edible cone will stick to the protective conical sleeve of the succeeding conical unit next above in the stack rather than to stay in position within its cooperating conical sleeve so that it feeds downwardly therewith.

The present invention will provide a dispenser for successively feeding the conical unit from the lower end of a nested stack of the units, without damage thereto, and without fail even if the edible cones tend to stick to the following protective conical sleeves. The dispenser is designed as an attachment for the packaging machine disclosed in said patent and will function in timed relationship thereto.

In the following description for clarity we shall refer to the edible cone as the "cone" and the protective paper conical sleeve as the "sleeve" to distinguish between these two conical members.

In the accompanying drawings we have illustrated a preferred form of our dispenser but it is to be understood that specific details can be varied without departing from the invention.

In these drawings:

FIG. 1 is a perspective view showing the cone and sleeve dispenser attachment of this invention and illustrating schematically a filling machine to which it is applied.

FIG. 2 is an enlarged horizontal sectional view taken along line 2—2 of FIG. 1.

FIG. 3 is a vertical sectional view taken along line 3—3 of FIG. 2.

FIG. 4 is a vertical sectional view taken along line 4—4 of FIG. 2.

FIG. 5 is an enlarged horizontal sectional view taken along line 5—5 of FIG. 3.

FIG. 8 is a vertical sectional view taken along line 8—8 of FIG. 2.

FIG. 9 is an enlarged vertical sectional view, partially schematic, taken substantially at the position indicated by line 9—9 of FIG. 1.

FIG. 11 is a diagrammatic sectional detail taken along line 11—11 of FIG. 9.

Figure 6:
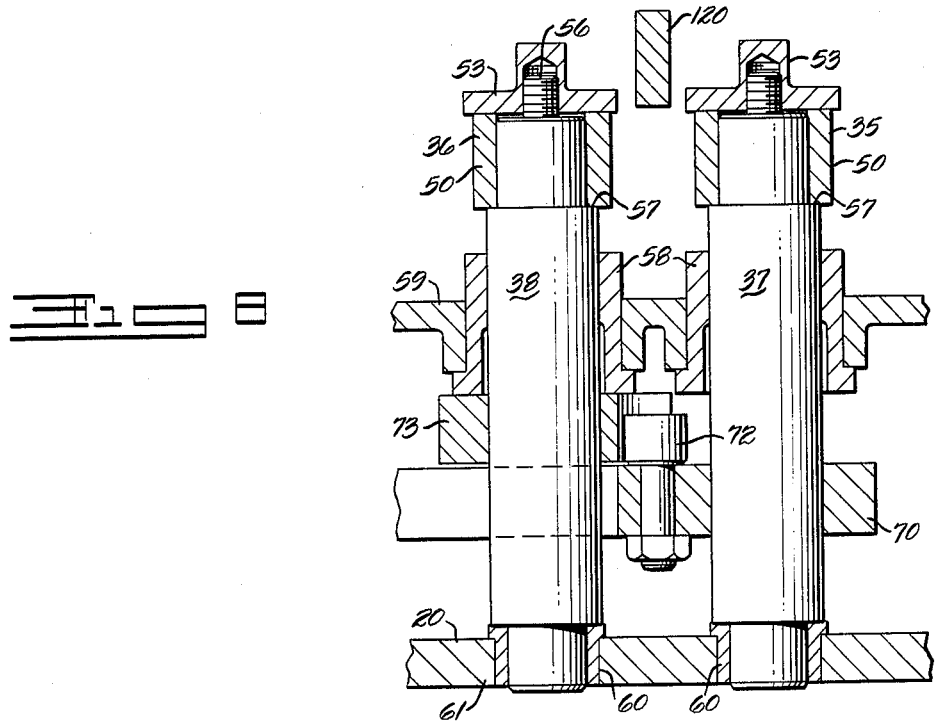
FIG. 6 is an enlarged horizontal sectional view taken along line 6—6 of FIG. 3.

With reference to the drawings, the dispenser of our invention is indicated generally by the numeral 15 in FIGURE 1 and as an attachment on a filling machine which is indicated schematically and generally by the numeral 16. The filling machine is of the structure described in said Patent No. 2,934,872 and includes a rotatable table or turret 54 having the upwardly opening angularly spaced pockets 55 for receiving the conical units to be filled. Each of these conical units, as described in said patent and as indicated in FIGURE 9, comprises an inner edible cone C and an outer protective paper cone or sleeve P. The cone C ordinarily nests within the sleeve P and when properly nested therein, as indicated in the upper portion of FIGURE 9, its upper edge $c$ will be spaced below the upper edge $p$ of the sleeve. The attachment 15 will be supported above the table 54, as shown in FIGURE 1, over the annular path of movement of the pockets 55 and the actuation of the attachment is timed with the intermittent movement of the table 54, so that the conical unis will be dispensed successively by the attachment as each rocket 55 is moved into receiving position by the intermittent rotation of the table 54. Although our dispenser is designed particularly for use in connection with the filling machine 16, it is to be understood that it is not limited to use with that machine but is capable of other uses.

Part of the driving mechanism of the attachment is enclosed within a housing 50a which is suitably mounted on the housing or cabinet 10 of the filling machine. This housing 50a is vertically disposed and is of considerable vertical extent being arranged close to the edge of the rotatable table 54. Supported on top of this housing 50a is a base or casting 20 which supports most of the parts of the dispenser. In the housing 50a, the vertically disposed drive shaft 21 (FIGURE 3) is provided and is suitably driven continuously by a suitable power take-off 22 (FIGURE 1) from the filling machine 16. The casting 20 carries an inwardly and upwardly extending support arm 25, as shown in FIGURES 1, 2, 3, and 10. On its outer end, this arm 25 has a support ring 26 which receives a tubular magazine insert 27. This magazine insert 27 slips downwardly into the support ring 26 and is provided with an enlarged upper portion 28 (FIGURE 9) which forms a shoulder 29 that rests on the upper edge of the ring. The insert 27 has a vertical annular passage 30 through which the cone and sleeve units may drop. The magazine insert 27 carries the upwardly extending guide and support rods 31. We preferably provide three of these rods and, as indicated in FIGURE 1, they lean at an angle and the stack of nested conical units will lean thereagainst. The upper ends of the rods 31 are joined together by a suitable plate 32.

To normally support the stack of nested conical units, releasable means is provided below the magazine insert 27 for engaging the lowermost conical units of the stack. This releasable means comprises a scissors-type support unit which is illustrated best in FIGURES 2, 3, 5 and 7 to 9. The scissors-type support unit comprises the two horizontally oscillatable scissors arms 35 and 36. Each of these arms extends outwardly from its respective pivot shaft 37 and 38 and is provided with a semicircular nest member 40 at its outer end for engaging one-half of the conical unit as indicated best in FIGURE 2. The level of the nest members (FIGURE 3) is such that they are below the magazine insert 27 and when in cooperative relationship, they cooperate to form a circular nest for receiving the lowermost of the conical units in the magazine to support the stack of such units. In fact, these nest members 40 are such that the two lowermost conical units in the stack will actually be engaged for support.

Figure 10:
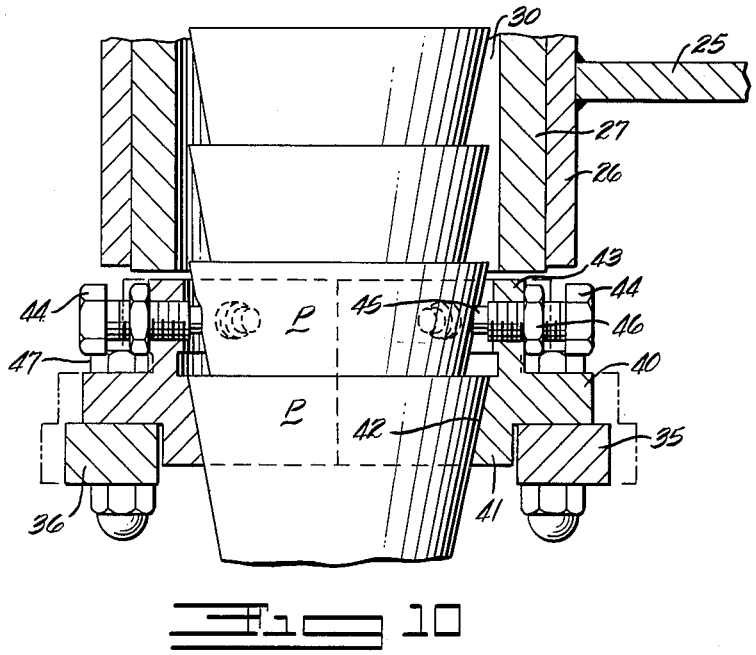
FIG. 10 is a vertical sectional view taken along line 10—10 of FIG. 9.

Thus, each of the nest members 40, as best shown in FIGURE 10, is provided with the lower semicircular support portion 41 which has a tapered inner surface 42 for engaging and supporting the outer surface of the sleeve P adjacent its upper end, this being the sleeve of the lowermost conical unit in the magazine. Above the support 41 is an upstanding semicircular flange 43. This flange 43 has threaded radially inwardly therethrough a number of screws 44 which are angularly spaced and which have rubber tips 45 on their inner ends. Lock nuts 46 are provided for locking the screws in adjusted position. The screw tips 45 will engage the sleeve P of the conical unit next above in the stack and will press inwardly on it slightly to flex it inwardly and support that conical unit. The nest members 40 rest on the outer ends of the scissors arms 35 and 36 and are attached thereto by means of the removable bolts 47.

It will be apparent that the ring-like nest provided by the cooperating semicircular nest members 40 on the outer end of the respective scissors arms 35 and 36 is coaxial with the sleeve magazine insert 27 and with the receiving pocket 55 (FIGURE 3) of the table 54 when it is moved into position therebelow.

The inner horizontally disposed portions of the arms 35 and 36 are each provided with a socket portion 50 (FIGURE 3) which receives the upper reduced end of the respective scissors arm pivot shafts 37 and 38, as shown in FIGURE 8. A retaining cap 53 is held in position on the upper end of each of the respective pivot shafts by means of a screw 56 and serves to keep the socket portion 50 downwardly in engagement with a stop shoulder 57 on each of the shafts 37 and 38. Each of the shafts 37 and 38 is supported by a bushing 58 in the top horizontal portion 59 of the casting 20. The lower reduced end of each shaft 37 and 38 (FIGURES 3 and 8) is rotatably disposed in a bushing 60 which is carried by an intermediate shelf 61 of the casting.

To oscillate the scissors arms 35 and 36, a cam 65 is adjustably fixed by a screw 64 to the upper portion of a coaxial extension 21a of the shaft 21, as shown in FIGURE 3. This shaft extension 21a is rotatably mounted in a bearing 66 in the top portion 59 of the casting 20 and in a bearing 67 in the bottom portion 68 of the casting. The scissors cam 65 engages with a roller or follower 69 (FIGURES 3 and 5) on the outer end of an actuating lever 70. This lever 70 is nonrotatably but adjustably fixed to the scissors shaft 37 by means of the setscrew 71. This lever 70 carries above its top surface a roller 72 spaced slightly inwardly of the shaft 37, which engages with a yoke 73 that is nonrotatably but adjustably fixed to the other scissors shaft 38 by means of a setscrew 74. A pin 75 is mounted in a socket 77 in the lever 70 and is slidably mounted in the upstanding arm of an L-shaped bracket 76 which is fixed to the portion 61 of the casting 20. Rigidly secured to the pin 75 and spaced inwardly of the end which extends into the socket 77 in the lever 70 is a spherical button 78 which bears against the edge of the lever. A compression spring 79 engages the upstanding portion of the bracket and bears against the button 78 to swing the lever 70 toward the scissors cam 65 in order to maintain the rollers 69 in contact with the cam 65. The cam 65 is so shaped that whenever the shaft extension 21a is rotated, the cam 65 will be rotated and will intermittently swing or oscillate the lever 70 about the axis of the shaft 37, thereby oscillating such shaft and oscillating the scissors arm 35. At the same time, the scissors shaft 38 and the scissors arm 36 carried thereby is oscillated, since swinging of the lever 70 will also swing the yoke 73 through the medium of the roller 72 to oscillate the shaft 38. Thus, the scissors arms 35 and 36 of the upper scissors unit are swung toward or away from each other simultaneously. This will move the two nest members 40 into or out of cooperative supporting relationship relative to the two lowermost conical units in the nested stacks.

Figure 7:
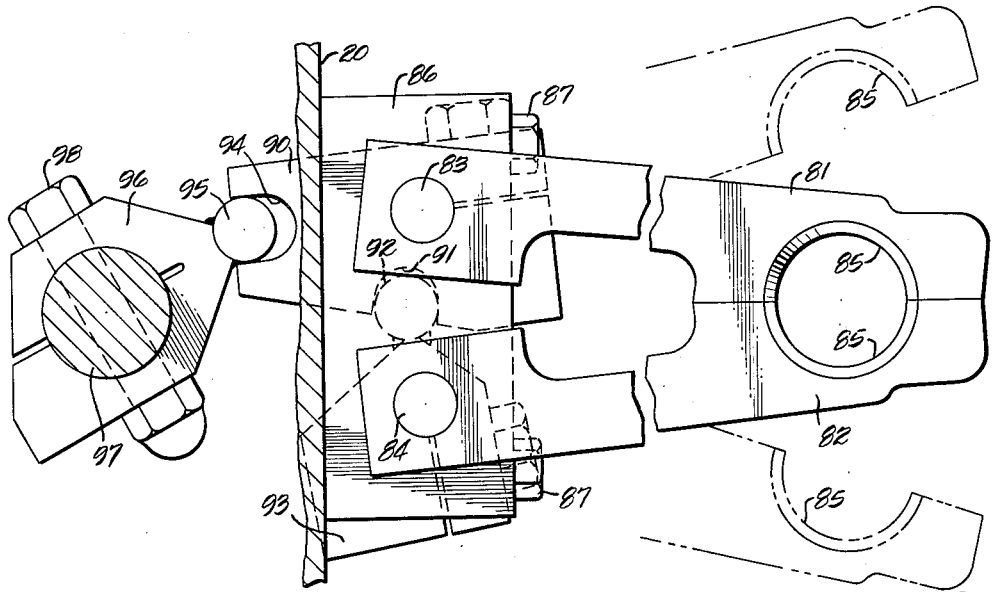
FIG. 7 is an enlarged horizontal sectional view taken along line 7—7 of FIG. 3.

To support the conical unit released by the upper scissors unit until the pocket 55 on the table 54 has moved into proper receiving position, a lower scissors-type support unit is provided which is similar to the upper scissors unit and is illustrated best in FIGURES 3, 7 and 9. This unit comprises the two horizontally oscillatable scissors arms 81 and 82 which have their inner ends fixed on the respective pivot shafts 83 and 84. The outer ends of these arms are provided with semicircular nest portions 85 which cooperate to provide a circular nest for receiving each dropped conical unit when the scissors arms 81 and 82 are swung together. The arms 81 and 82 are fixed on the upper ends of the respective shafts 83 and 84 and these shafts are rotatably mounted in a bearing block member 86 which projects outwardly and is attached to the outer face of the casting 20 by means of the bolts 87. The lower end of the shaft 83 has adjustably fixed or clamped thereto a yoke 90. This yoke 90 has an inwardly opening notch 91 which receives a pin 92 that is carried by the inner edge of an adjacent clamp 93 which is clamped in fixed but adjustable position to the scissors shaft 84. The yoke 90 is provided with a second rearwardly opening notch 94 which receives a pin 95 on an adjacent clamp member 96 which is clamped around the lower end (FIGURE 3) of an actuating shaft 97 by means of a clamping bolt 98 so that it is adjustable thereon but is ordinarly fixed thereon. The shaft 97 is rotatably mounted in an upper bearing 99 in the shelf 61 of the casting 20 and in a lower bearing 100 in the bottom portion 68 of the casting. It will be apparent that when the shaft 97 is oscillated, the yoke 90 is oscillated, thereby oscillating the scissors arm 81 and simultaneously the member 93 is oscillated thereby oscillating the scissors arm 82.

A cam arrangement is provided for oscillating the shaft 97 and includes the cam 101, which is fixed on the shaft extension 21a above the bottom portion 68 of the casting 20 as shown in FIGURE 3. A setscrew 103 is provided in the cam 101 for engaging the shaft extension 21a to set the cam in a fixed position which can be adjusted when desired. The edge of the cam 101 engages a follower or roller 104 which is on the outer end and lower side of an actuating lever 105 that is rotatably carried by a pin 106 depending from the portion 61 of the casting 20. The opposite end of this lever is provided at its lower side with a roller 107 which engages with a notch 108 in a yoke 109 clamped to the shaft 97 by means of a clamping screw 111 which may be released for adjustment of the member 109 about the axis of the shaft 97. It will be noted from FIGURE 3 that the yoke 109 is positioned on the shaft 97 above the member 96 and substantially at the level of the cam 101. The lever 105 is urged in a clockwise direction (FIGURE 6) about the axis of the pin 106 to keep the roller 104 in engagement with the edge of the cam 101 by means of a spring and rod unit 112 which is exactly like the corresponding unit provided in association with the upper actuating lever 70 and which is carried by a bracket 115 on the bottom portion 68 of the casting 20.

It will be apparent that rotation of the shaft extension 21a will produce rotation of the cam 101 which will, in turn, oscillate the lever 105 and produce oscillation of the yoke 109 and the shaft 97 to thereby oscillate the scissors arms 81 and 82. Such arms will move together so that the nest portions 85 will provide a complete circular nest for receiving and supporting the conical unit dropped from the upper scissors nest when the upper scissors 35 and 36 separate. When the scissors arms 81 and 82 separate, the supported conical unit will drop on downwardly into the upwardly opening pocket 55.

Spacers collars 86a are shown in FIGURES 3 and 9 between the upper surface of the block 86 and the scissors arms 81 and 82 around the shafts 83 and 84 and spacer collars 116 of greater thickness are provided between the members 90 and 93 and the block 86 around the respective shafts 83 and 84, and these spacers may be interchanged to vary the level of the lower scissors arms 81 and 82 relative to the upper scissors arms 35 and 36.

As previously indicated, it sometimes happens that when the scissors of the lower supporting unit are opened to drop the conical unit to the receiving cup 55, the cone C sticks to the paper sleeve P of the following conical unit above, as shown in FIGURE 9, rather than dropping with the sleeve next below in which it is usually disposed. To prevent this, a cone stripping unit is provided and this unit is illustrated best in FIGURES 2, 3, 4, 8, 9, and 11.

Figure 12:
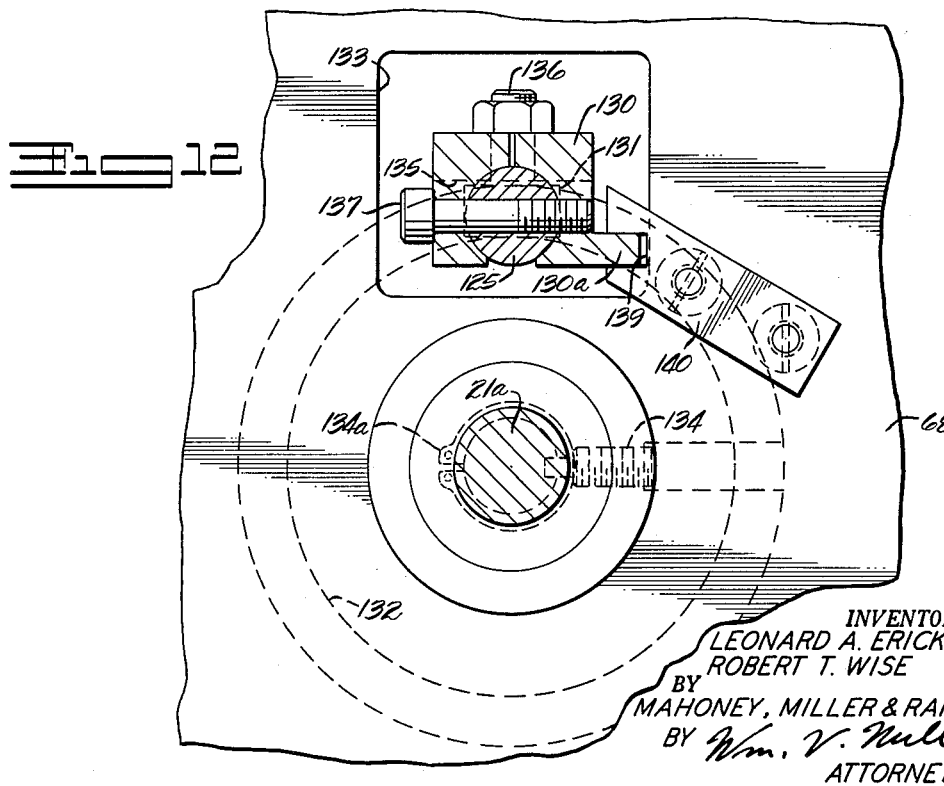
FIG. 12 is a horizontal sectional view taken along line 12—12 of FIG. 4.

This stripper means comprises a stripper arm 120 (FIGURES 2, 3 and 4) mounted for vertical swinging movement above the casting 20 on a horizontal pivot pin 121 which is carried by an upstanding lug or support 122 secured to the top 59 of the casting by means of bolts 123. The rear or inner end of the arm 120 is bifurcated (FIGURE 2) and straddles the lug 122. The arm 120 is moved vertically about the pivot 121 by means of a push rod or lifting rod 125 which has its upper end pivotally connected to the arm 120 by means of a pin and notch connection 126 (FIGURE 4). The rod 125 is slidably mounted in a flanged bushing 127 positioned upwardly in an opening in the top portion 59 of the casting 20 and in a shouldered bushing unit 128 positioned upwardly in an opening in the intermediate shelf portion 61 of the casting. A compression spring 129 has its upper end positioned in a downwardly opening socket in the bushing 127 and its lower end bearing against the extended ends of a transverse pin 129a extending through the rod 125. Thus, this spring will tend to pull the rod 125 downwardly and pull the stripper arm 120 downwardly therewith. The lower end of the rod 125 carries an adjustable cam follower unit 130 which includes a roller or follower 131 that is pressed against a face cam 132, the spring 129 always maintaining contact of the roller with the cam, it being noted that the bottom portion of the casting 20 is provided with an opening 133 to permit this contact. The face cam 132 is keyed on the shaft extension 21a by means of a setscrew 134 (FIGURES 3 and 12) and is positioned at a predetermined level by means of a split retaining collar 134a. It will be noted from FIGURE 3 that the lower end of the shaft extension 21a and the upper end of the drive shaft 21 are coupled together by a coupler 21b.

The cam follower unit 130 (FIGURES 4 and 12) includes a block 135 which is single branched at its lower end for receiving the roller 131 carried by means of a bolt 136 passing therethrough and serving as an axle. The upper portion of the block 135 receives the lower end of the rod 125 and is clamped thereto by means of a clamping bolt 137 extending at right angles to the bolt 136. This bolt 137 extends through a vertical slot 138 provided in the rod 125 so that the block 135 can be adjusted vertically relative to the rod. This vertical adjustment is for the purpose of varying the extent of swing of the stripper arm 120 by changing the relative position of the roller axle 136 and the arm connection 126.

The block 135 is provided with a guide flange extension 130a which is positioned for vertical sliding movement in a vertical guide slot 139 (FIGURES 4 and 12) formed in the inner edge of a guide block 140. The block 140 is fastened in upstanding position on the bottom casting portion 68 of the casting 20. This guide arrangement will permit vertical movement of the roller 131 with the rod 125 but will prevent swinging movement of the roller about the axis of the rod 125.

The outer or forward end of the stripper arm 120 carries the stripper 145, as shown best in FIGURES 3 and 9. The arm is downturned at its outer end, as indicated at 120a, and is provided with a bifurcated extremity 146 which is provided with aligning notches 147. The upper end of the stripper 145 fits within the bifurcated end of the arm and carries a transverse pivot pin 148 which is disposed in the notches 147. A spring 149 is connected between a transverse pin 150 carried by the arm 120 and a transverse pin 151 provided on the stripper 145, both of these pins being spaced from the pivot pin 148. This spring 149 will maintain the pin 148 in the notches 147 and will bias the stripper 145 inwardly or clockwise. The stripper 145 is shown in detail in FIGURE 11 and it will be noted that its lower end is provided with a transversely extending horizontal portion 152 which has an outwardly projecting stripper finger 153 formed thereon intermediate its transverse extent and spaced upwardly from the lower edge thereof. Obviously, vertical swinging movement of the arm 120 will produce corresponding vertical movement of the stripper 145 and the stripper finger 153 thereof.

A cam arrangement is provided for producing the necessary swinging movement of the stripper 145 during its vertical movement and this arrangement is also shown best in FIGURES 3 and 9. This cam arrangement comprises a cam 155 which is bolted to the face of the casting 20 by the bolts 156. The cam is in a vertical plane corresponding substantially to that of the vertical part of the stripper 145 and is provided with an outer cam edge 157 which is angled outwardly toward the lower end of the cam. The rear surface of the horizontal portion 152 of the stripper is always maintained in engagement with the cam edge 157 by means of the spring 149. As the stripper 145 moves downwardly, it is swung outwardly by the cam 155 to cause the finger 153 to move closer to the axis passing through the magazine insert 30 and the nest provided by the upper and lower scissors units, as indicated by the broken lines in FIGURE 9.

When the spacer collars 86a and 116 are interchanged to change the level of the nest provided by the lower scissors unit, it is also necessary to change the relative position of the cam edge 157 which can be done by removing or replacing shims (not shown) between the face of the casting 20 and the adjacent surface of the cam.

With the face cam 132, the scissors cam 101, the scissors cam 65 and the stripper cam 155 properly set and the shaft 21 driving the shaft extension 21a continuously, the dispenser will function as described below with reference to the drawings: The initial condition of the dispenser has the stripper arm 120 is raised position, the stripper lever arm 145 swung into its innermost position with the stripper finger 153 retracted from the stack of conical units, the stack of such conical units supported by the upper nest provided by the closed scissors arms 35 and 36 and by the lower nest provided by the closed lower scissors arms 81 and 82. At this time, the stack of conical units will be engaged by means of the tapered surfaces 42 of the nest members 40 which engage the outer surface of the sleeve P of one conical unit and the rubber tips 45 of the screws 44 carried by such members which engage the sleeve P of the conical unit next above.

As the scissors cams continue to rotate, the upper scissors arms 35 and 36 will open to allow the stack of conical units to be supported only on the lower scissors nest, the distance between the upper nest and the lower nest being such that the upper end of the second conical unit in the lower nest-supported stack will be enclosed within the upper nest at a level to be later engaged by the tapered surface 42 thereof and the third conical unit in that stack will have its upper end at a level to be subsequently engaged by the rubber screw tips 45. The upper scissors arms 35 and 36 will next close to provide an upper nest to again support the stack and the lower scissors arms 81 and 82 will spread to open the lower nest to allow the lowermost conical unit to drop into the aligned pocket 55. While the lower nest is open, the stripper 145 is moved downwardly and inwardly so that, as shown in FIGURE 9, it will engage the upper edge of the sleeve as previously supported by the lower nest to insure that it will drop downwardly if it fails to drop by gravity. If the cone C of the conical unit which includes the sleeve P that is being dropped by the opened lower nest sticks to the sleeve P of the conical unit next above, as shown in FIGURE 9, the finger 153 will engage the upper edge of that cone as the finger moves on downwardly and outwardly, as shown in broken lines, and will cause the cone to drop into its sleeve which has previously dropped. While the lower nest is open the table 54 is stationary so that the pocket 55 is in proper position to receive the dropped conical unit. The lower nest will now start to close and simultaneously the stripper 145 will start to move upwardly and outwardly, and as it approaches its upper limit, the upper nest will again open and then the above-described dispensing cycle will be repeated.

It will be noted that initially the finger 153 will be recessed upwardly within a notch 153a in the associated nest member 40. Also, it will be noted that the cam edge 157 is substantially straight at its upper end as indicated at 157a so that the finger 153 will move downwardly to some extent before it moves inwardly. Furthermore, it will be understood that the lower scissors cam 101 is so shaped and positioned relative to the upper scissors cam 65 and so shaped relative to the stripper cam edge 157 that the lower nest will stay open sufficiently long to permit the stripper to function as indicated, the upper nest to remain closed while the lower nest is open and then as the stripper moves upwardly, the lower nest to close. The screws 44 with the supporting rubber tips 45 are provided for additional support of the upwardly extending stack of cones and sleeves and the rubber tips 45 provide a flexible means of maintaining that support even if the cones are not quite uniform in size or shape. Also, if the cone between the sleeve P and sleeve S is unusually thin, and/or the sleeve S is malformed, the taper 42 may not alone support the whole weight of the upward extending stack of sleeves and cones. The initial setting of the screws 44 with the supporting rubber tips 45 is made for feeding of cones of usual variation in diameter or roundness but if cones having a more than usual out-of-roundness or larger than usual diameter are dispensed, the setting of the screws 44 with the supporting rubber tips 45 can be changed to suit.

It will be apparent that our invention provides a dispenser which is particularly effective as an attachment for a filling machine of the type indicated. The dispenser will function effectively even if the conical units tend to stick together due to the action of the stripper which we provide. However, our dispenser will function with various types of nested hollow cup-like units, whether or not they are of annular cross-section, which might tend to stick together and with which it is necessary to provide a positive stripping means.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described our invention, what we claim is:

1. A dispenser for dispensing nested hollow conical units each comprising an outer flexible conical sleeve and an inner cone disposed within the sleeve with its upper edge disposed below the upper edge of the sleeve, said dispenser comprising a lower supporting nest composed of separable nest members for supporting a stack of the units by engaging the lowermost article and an upper supporting nest composed of separable nest members for engaging the first and second units next above the lowermost unit, downwardly movable stripping means for engaging the lowermost unit to insure separation from the unit next above, and means for actuating said lower and upper nests successively to release the lowermost unit and to move said stripping means downwardly to engage said lowermost unit as it is released, said upper supporting nest members each being provided with a lower tapered supporting surface complemental to said sleeve and for engaging the sleeve of one said first unit next above said lowermost unit adjacent its upper edge and a set of fingers projecting inwardly at a level above said tapered surface for engaging the sleeve of the said second unit next above said lowermost unit adjacent its upper edge.

2. A dispenser according to claim 1 in which said fingers are adjustable in and out and are provided with tips of friction material.

3. A dispenser for dispensing nested hollow articles of cup-like form comprising a lower supporting nest composed of separable nest members for supporting a stack of the nested articles by engaging the lowermost article and an upper supporting nest composed of separable nest members for engaging the first and second articles next above the lowermost article, each of said nest members being carried by a scissors arm, the scissors arms of the respective upper and lower nests being pivoted together for relative movement, cam means for actuating the scissors arms of each nest in timed relationship to release the lowermost article while supporting the stack above, downwardly movable stripping means for engaging the lowermost article to insure separation from the article next above, said stripping means comprising a stripping lever pivoted for horizontal swinging movement, and means for operating said stripping means in timed relationship to the actuation of said scissors arms to cause said stripping lever to engage the article released by said lower nest, said operating means comprising cam means for moving the stripping lever downwardly and additional cam means for swinging the lever toward the axis of the stack of articles, each of the nest members being a segmental member for engaging a portion of the perimeter of the associated article, each of the nest members of the upper nest comprising a lower article-engaging surface for engaging the said first article next above and a plurality of inwardly projecting article-engaging fingers above said surface for engaging said second article next above said lowermost article.

4. A dispenser according to claim 3 in which a magazine is provided for the stack of nested articles and has a sleeve at its lower end through which the stack drops, said upper nest being directly below the sleeve and said lower nest being spaced below the upper nest, said stripping lever being pivoted at its upper end to a vertically movable support which is moved downwardly by said cam means so that the stripping lever moves from a position adjacent the upper nest to a position adjacent the lower nest, said cam means for swinging the stripping lever being located between the upper and lower nests and engaging the lower end of the lever to impart the horizontal swinging to the lever during its downward movement.

5. A dispenser according to claim 4 in which the stripping lever has a stripping finger at its inner edge and is engaged by the cam at its outer edge, said cam having a cam edge which includes a vertical upper portion and an inwardly angled lower portion.

6. A dispenser according to claim 4 in which said support for the stripping lever comprises a horizontal arm pivoted for vertical swinging movement, said cam means for moving the support vertically comprising a cam mounted for rotation about a vertical axis, and a vertically movable rod operatively connected to said arm and cooperating with said cam.

7. A dispenser according to claim 6 in which the cam means for operating the scissors arms of each nest comprises a rotatable cam, and means for driving said scissors cams and said cam for swinging the stripper arm in timed relationship.

8. A dispenser according to claim 7 in which the scissors arms of each nest are pivoted together for relative swinging movement and means connecting the scissors arms together so that they swing simultaneously away from each other or toward each other.

9. A dispenser according to claim 8 in which said rotatable scissors operating cams are relatively rotatively adjustable to time the operation of the scissors properly relatively.

References Cited in the file of this patent
UNITED STATES PATENTS

| | | |
|---|---|---|
| 1,623,353 | McCarthy | Apr. 5, 1927 |
| 1,963,621 | Geyer | June 19, 1934 |
| 2,894,361 | Ullman et al. | July 14, 1959 |
| 2,954,900 | Brubaker | Oct. 4, 1960 |